Patented Feb. 24, 1931

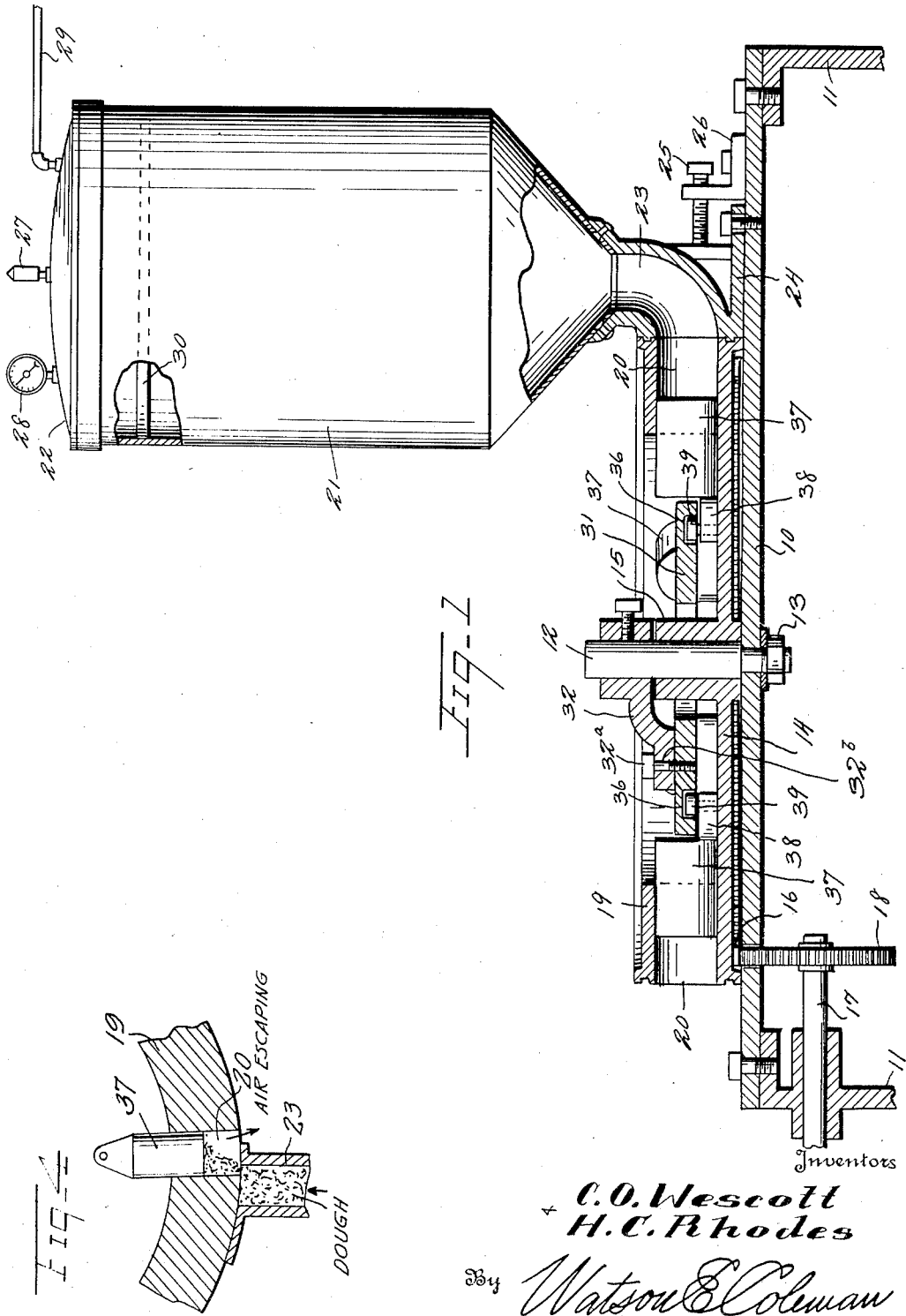

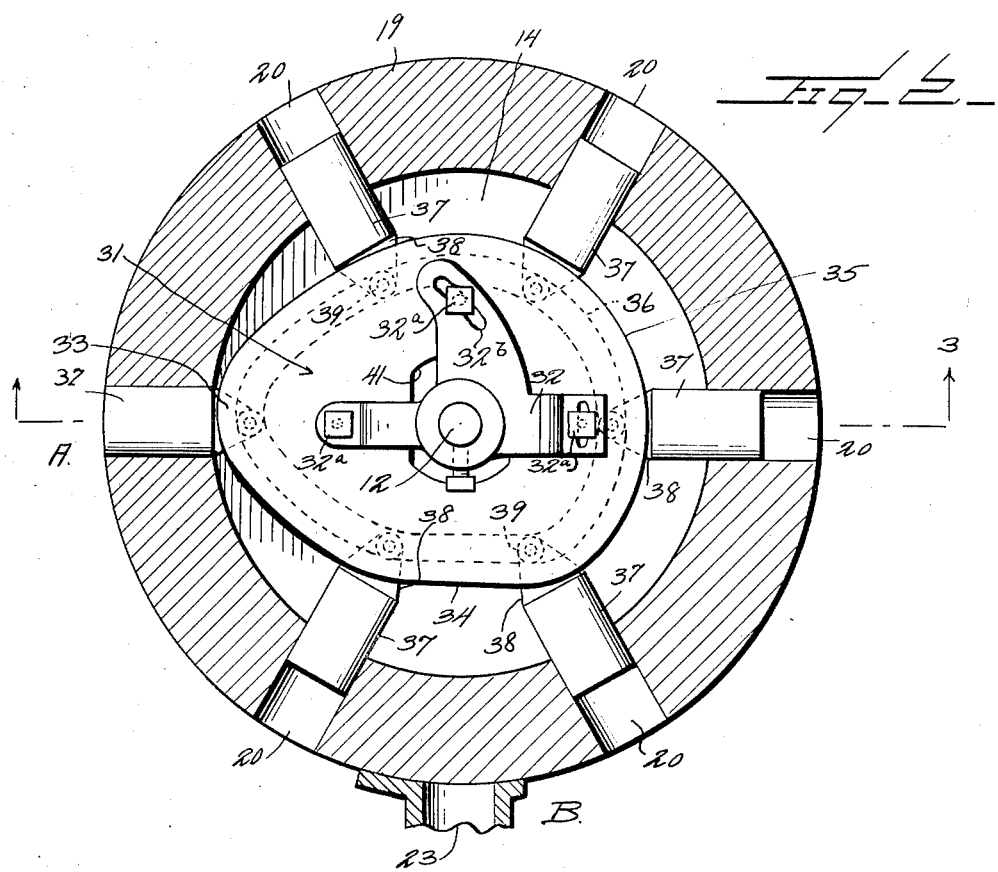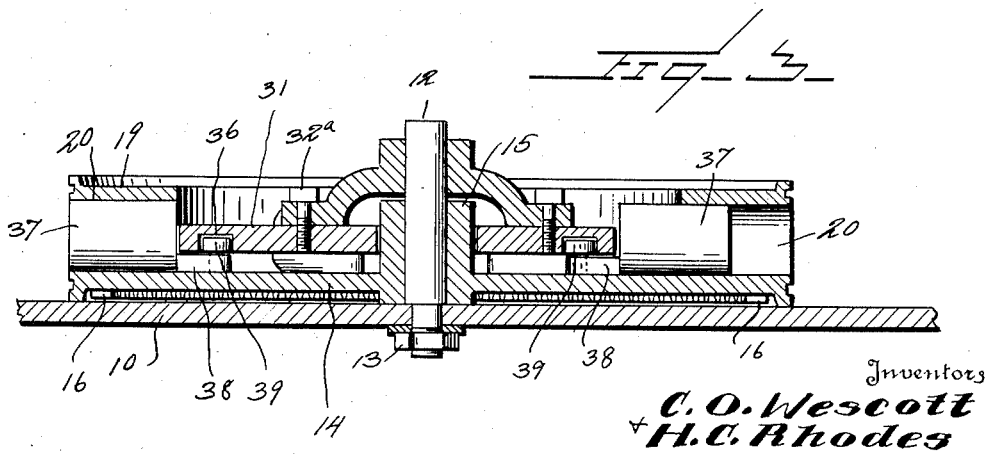

1,793,981

UNITED STATES PATENT OFFICE

CHARLES OSCAR WESCOTT AND HERBERT CECIL RHODES, OF PORTLAND, OREGON

DOUGH DIVIDER

Application filed February 28, 1929. Serial No. 343,327.

This invention relates to machines for dividing plastic materials, and particularly dough into small bodies for use in making rolls, biscuits, buns, loaves of bread and the like and particularly to a divider which includes a rotatable mold or pocket carrier, plungers operating therein, and compressed air means for forcing dough from a dough receiver into successive pockets as these are brought in proper relation to the outlet of the dough receiver.

One of the objects of the present invention is to provide a construction of this character wherein the dough is forced out by compressed air from the dough receiver into successive pockets, but which is so constructed that all the air may escape from the molding pockets to thus permit the entire pocket to be filled with dough and thereby prevent what is known as "punishing the dough."

A further object is to provide means whereby the outlet of the dough receiver may be adjustably brought into proper relation to the path of travel of the ends of the mold pockets.

Another object is to provide means to positively project and retract the plungers which operate in the mold pockets and to so construct this means that the degree of retraction of the plungers may be controlled to thereby provide for drawing varying amounts of dough into the mold pockets so that the machine may be adapted either for dividing the dough into small amounts or lumps or relatively large amounts such as would be used for making loaves of bread.

Another object is to provide a construction of this character so formed that a series of molds may be disposed one above the other upon the same operating table thereby doubling, trebling or otherwise increasing the capacity of the machine.

Another object is to provide a machine of this character in which the mold carrying wheel or element is in continuous motion and is not intermittently moved into position in front of the dough receiver.

Other objects will appear in the course of the following description.

Our invention is illustrated in the accompanying drawings, wherein:—

Figure 1 is a vertical sectional view of a dough divider constructed in accordance with our invention;

Figure 2 is a horizontal sectional view through the rotatable mold carrier showing the cam in plan;

Figure 3 is a section on the line 3—3 of Figure 2;

Figure 4 is a fragmentary sectional view of the carrier and the throat 23 with the pocket moved slightly beyond the throat.

Referring to these drawings, 10 designates a plate or table having any suitable supports 11. This plate or table 10 may be mounted by means of the supports 11 upon a bun and finger roll molding machine such as illustrated and described in our Patent No. 1,726,969, issued on the 3rd of September, 1929.

Extending upward from the table 10 is a fixed shaft 12 supported by means of a nut 13 or otherwise mounted, and rotating upon this shaft is the mold carrier 14 in the form of a disk or wheel having a central hub 15 fitting the shaft 12. This disk or wheel might be supported by ball bearings or in any suitable manner but the carrier is provided with gear teeth 16.

Extending through one of the supports 11 is a driving shaft 17 carrying on it the gear wheel 18 which extends through a slot in the table 10 and engages the gear teeth 16. Thus, as the shaft 17 is rotated, the carrier 14 will rotate. The carrier is formed with an outer wall 19 as shown in Figure 1 formed with a plurality of molding pockets 20 radial to the center of the carrier.

Disposed upon the table 10 is a vertically extending receptacle 21 constituting a dough receiver having a cover 22. The lower end of this dough receiver is formed with a downwardly and laterally extending discharge neck or throat 23, the outer edge face of which is slightly concave and fits closely against the convex peripheral face of the wall 19. This throat or mouth 23 has a diameter at its extremity the same as the diameter of the molding pockets 20 so that as each molding pocket is brought in front of the throat 23, the dough will be discharged into the molding pocket. The base 24 of the dough receiver is slidingly mounted upon the table 10 and the screw 25 which passes through a bracket 26 mounted upon the table bears against a portion of the dough receiver adjacent the throat 23 so that by turning this screw 25, the dough receiver may be forced inward to bring the throat 23 into close engagement with the periphery of the wall 19.

The cover 22 carries upon it a safety valve 27, a pressure indicator 28 and a pipe 29 which may lead to any source of air pressure. Disposed within the receiver is a follower 30. The receiver is intended to be filled with dough, then the follower placed thereon and the air pressure acts to force the dough downward and out of the throat 23 and into the successive mold.

Disposed within the annular wall 19 is a fixed cam 31 which is held from rotation by a spider 32 fast on the fixed shaft 12, the periphery of the cam being formed to provide the protuberant portion 33 which projects radially outward nearly to the inner face of the wall 19 and the relatively flat portion 34 which merges at one end into the outer face of the protuberant portion 33 and at the other merges into the peripheral face 35 of the cam.

This peripheral face 35 is concentric to the inner face of the wall 19 and inwardly spaced therefrom. The face 35 extends nearly at right angles to the protuberance 33.

Inward of the peripheral face of the cam 31 there is disposed a groove 36. Operating radially over the upper face of the carrier 14 are a plurality of plungers 37, one for each of the pockets 20. Each of these plungers at its inner end is reduced in thickness as at 38 and carries the upwardly projecting roller 39 which engages in the groove 36, the peripheral face of the eccentric 33 engaging against the end wall 40 of the plunger above the rearwardly projecting portion 38. It will, therefore, be seen that as the carrier 14 revolves, the plungers will be positively forced outward into the molding pocket when they reach the point A and fully retracted when they reach the point B, the points A and B being disposed substantially in quartering relation to each other. At the time when the plunger is retracted, the pocket comes opposite the throat 23 and the pressure of air within the dough receiver 21 forces a mass of dough outward into the pocket. The carrier continues its motion and, of course, the peripheral face of the wall 19 cuts off the dough and closes the throat 23 until the next pocket arrives into position with its plunger retracted. After a pocket has passed the throat 23, the plunger is forced partly outward and when the pocket has reached the position A, the plunger is forced fully outward to eject the contents of the pocket.

The cam 31 is formed with a slot 41 at its center, this slot extending at right angles to the longer axis of the cam so as to permit the cam to be adjusted toward or from the throat of the dough receiver to thus cause a greater or less retraction of a plunger as it comes around to the point B while retaining, of course, full projection of the plunger to eject the dough from the mold pocket. Adjustment of the cam may be obtained in any suitable manner although this adjustment must be such that the end 33 of the cam remains in a substantially fixed position so that the plungers 37 are fully extended during their passage thereby. In the present instance, I have shown the spider 32 as having a plurality of arms one of which is directed toward the end 33 of the cam and is connected to the cam by a bolt 32ª forming a pivot. The remaining arms are slotted as indicated at 32ᵇ being arcuately curved with the axis of bolt 32ª as a center. It will be obvious that by employing a structure of this character, the heel of the cam may be adjusted toward or away from the point B without noticeably disturbing the plungers positioned at the point A.

It will be noticed from an inspection of Figures 2 and 4 that the pockets 20 are of greater diameter than the thickness of the wall of the passage 23 on that side of the passage toward which the carrier is rotating so that, as shown in Figure 4, as the dough is being forced into the pocket as the pocket is passing the relatively thin wall 23a, air is permitted to escape from the pocket until the pocket has traveled past the relatively thin wall 23a. The pocket is thus permitted to fill with dough without trapping air in the pocket and within the dough and accordingly "punishing" of the dough by trapping air under high pressure within the pocket is prevented. If it were not for this construction, the air trapped within the pocket would act to compress the dough so that it would not make good bread. It has been found in actual practice that due to the rapidity of rotation of the wheel carrying the pockets, the dough does not follow the air out of the pocket but remains within the pocket until positively expelled by the plungers 37.

By this mechanism it will be seen that a body of dough is divided into small bodies such as suitable for making rolls, buns or the like or into larger bodies suitable for making loaves of bread or the like. Where the device is used in connection with the bun and roll forming machine or loaf forming machine shown in our patent before referred to, the lump of dough discharged from a mold pocket falls downward on to a travelling apron and is there rolled up or formed into a bun, roll or loaf. It will be obvious that the dough divider may discharge its small bodies of dough into any suitable receptacle or on to a travelling conveyor or the like.

It will be seen that with this construction the size of a piece of dough into which the dough is divided may be regulated to any size desired. In practice this would run from pieces of dough weighing one-half ounce up to the ordinary bread size or two pounds. It will also be noted that with this machine, the carrier 14 does not halt in its rotation, but is moved continuously. This is permitted by the positive feed from the tank and the positive action of the cam 33 which secures a great rapidity of operation.

While this machine is particularly designed for the purpose of dividing dough, it will be obvious that it might be used for dividing other plastic materials than dough and, therefore, we do not wish to be limited to its use as a dough dividing machine, though, as before stated, it is particularly adapted for this purpose.

We claim:—

1. A dough dividing machine including a support, a circular carrier rotatably mounted upon the support and having a circumferential wall and formed to provide a plurality of radially disposed mold pockets and means for rotating the carrier, a plurality of plungers operating radially in said pockets, means acting to positively project and retract said plungers as the carrier is rotated, a dough receptacle mounted upon the support and having a discharge neck against the outer end of which the peripheral wall of the carrier bears and with which the mold pockets successively register, each mold pocket having a diameter greater than the thickness of the wall of said neck, and means for exerting continuous pressure on the dough within the receptacle, the neck being so formed that as a pocket moves toward a position of registry with the neck, the escape of air from the pocket will be permitted.

2. A dough dividing machine including a support, a circular carrier rotatably mounted upon the support and having a circumferential wall formed to provide a plurality of radial mold pockets, means for rotating said carrier plungers operating radially in said pockets, means operating to positively project and retract said plungers as the carrier is rotated in one direction, and a dough receptacle mounted upon the support and having a discharge neck against the outer end of which the peripheral wall of the carrier bears and with which the mold pockets successively register, and means for exerting continuous air pressure on the dough within the receptacle, the neck being so formed as to permit the escape of air from the pocket as a mold pocket moves toward a position of registry with the neck.

3. A dough dividing machine including a support, a carrier shiftably mounted upon the support and having a wall formed to provide a plurality of mold pockets, a plurality of plungers on the carrier coacting with the pockets, a dough receptacle having a discharge neck against which the outer face of the wall of the carrier bears, means for shifting said carrier to bring the mold pockets successively into register with said discharge neck, means operating to retract a plunger before the corresponding pocket comes into register with the discharge neck and operating to project the plunger after the pocket has fully passed the discharge neck, and means for exerting continuous pressure upon the dough within the receptacle to force it out of said neck, the neck being so formed that as a pocket moves toward a position of registry with the neck, the escape of air from the pocket will be permitted.

4. A dough dividing machine including a support, a carrier shiftably mounted upon the support and having a wall formed to provide a plurality of mold pockets, plungers operating in said pockets, a dough receptacle mounted upon the support and having a discharge neck against which the outer face of the wall of the carrier bears, means for shifting the carrier to bring the mold pockets successively into register with the dough receptacle, means operating to positively retract the corresponding plunger in a mold pocket before the mold pocket is in register with the discharge neck, and project said plunger when the mold pocket has fully passed the discharge neck, and means for exerting continuous pressure on the dough within the receptacle to force it out of said neck, each mold pocket having a diameter greater than the thickness of the wall of said neck whereby as a pocket moves toward a position of registry with the neck, the air may escape past the wall of the neck.

In testimony whereof we hereunto affix our signatures.

CHARLES OSCAR WESCOTT.
HERBERT CECIL RHODES.